US009970566B2

United States Patent
Rovera

(10) Patent No.: US 9,970,566 B2
(45) Date of Patent: May 15, 2018

(54) BISTABLE ELECTRIC VALVE, IN PARTICULAR FOR A SYSTEM FOR RECOVERING PETROL VAPOURS IN A MOTOR VEHICLE

(71) Applicant: BITRON S.p.A., Turin (IT)

(72) Inventor: Alessandro Rovera, Borgo San Dalmazzo (IT)

(73) Assignee: BITRON S.p.A., Torino (IT)

( * ) Notice: Subject to any disclaimer, the term of this patent is extended or adjusted under 35 U.S.C. 154(b) by 85 days.

(21) Appl. No.: 15/123,099

(22) PCT Filed: Mar. 18, 2015

(86) PCT No.: PCT/IB2015/051976
§ 371 (c)(1),
(2) Date: Sep. 1, 2016

(87) PCT Pub. No.: WO2015/140726
PCT Pub. Date: Sep. 24, 2015

(65) Prior Publication Data
US 2017/0067572 A1    Mar. 9, 2017

(30) Foreign Application Priority Data

Mar. 19, 2014  (IT) .............................. TO2014A0224

(51) Int. Cl.
*F16K 31/06*    (2006.01)
*F16K 31/08*    (2006.01)
*F02M 25/08*   (2006.01)

(52) U.S. Cl.
CPC ...... *F16K 31/0658* (2013.01); *F16K 31/0651* (2013.01); *F16K 31/082* (2013.01);
(Continued)

(58) Field of Classification Search
CPC .......... Y10T 137/3476; Y10T 137/353; F16K 31/0651; F16K 31/082; F16K 31/08;
(Continued)

(56) References Cited

U.S. PATENT DOCUMENTS 4,294,286 A * 10/1981 Ohumi .................. F16K 31/082
137/625.48
4,403,765 A *  9/1983 Fisher ................... F16K 31/082
137/625.65
(Continued)

FOREIGN PATENT DOCUMENTS

| DE | 103 07 059 A1 | 11/2003 |
| FR | 2 600 150 A1 | 12/1987 |
| IT | 01308473 B1 | 12/2001 |

OTHER PUBLICATIONS

Written Opinion of the International Searching Authority of PCT/IB2015/051976 dated Jun. 10, 2015.
(Continued)

*Primary Examiner* — Matthew W Jellett
(74) *Attorney, Agent, or Firm* — Sughrue Mion, PLLC

(57) ABSTRACT

Bistable electric valve comprising a housing (2) in which there is defined a chamber (10) having first and second openings (11a, 12a) and a main ferromagnetic obturator (15) displaceable between first and second working positions in which it respectively closes and opens the first opening (11a) for enabling and disabling respectively a flow of fluid from the second opening (12a) to the first opening (11a). The main obturator (15) has a through-hole (17) for establishing communication between the upstream and downstream regions. First and second permanent magnets (13, 14; 31, 32) are mounted in the housing (2) in the vicinity of the first and second openings (11a, 12a) for keeping the main obturator (15) in the first and second working positions, respectively. An auxiliary obturator (22) is mounted move-
(Continued)

able in between the main obturator (15) and said second opening (12*a*) between first and second positions in which it closes and opens the through-hole (17), respectively. A third permanent magnet (21) is integral with the auxiliary obturator (22) and a control solenoid (6) is arranged around the path of the main obturator (15) and the auxiliary obturator (21) and is designed to generate a magnetic flux tending to cause the attraction of the main obturator (15) and the auxiliary obturator (22) towards one or other of said first and second openings (11*a*, 12*a*).

7 Claims, 6 Drawing Sheets

(52) U.S. Cl.
CPC .......... *F16K 31/084* (2013.01); *F16K 31/086* (2013.01); *F02M 2025/0845* (2013.01); *Y10T 137/3476* (2015.04); *Y10T 137/353* (2015.04)

(58) Field of Classification Search
CPC . F16K 31/086; F16K 31/084; F02M 25/0836; F02M 2025/0845

USPC .............. 251/30.01–30.04, 65; 137/221, 222
See application file for complete search history.

(56) References Cited

U.S. PATENT DOCUMENTS

| | | | | |
|---|---|---|---|---|
| 5,351,934 | A * | 10/1994 | Jensen | F16K 1/123 251/129.1 |
| 5,529,281 | A * | 6/1996 | Brudnicki | F16K 1/123 251/129.03 |
| 5,529,387 | A * | 6/1996 | Mialkowski | F16K 1/12 251/129.21 |
| 6,994,308 | B1 * | 2/2006 | Wang | F16K 1/12 251/129.21 |
| 2004/0040547 | A1 | 3/2004 | Ivens et al. | |
| 2015/0152972 | A1 * | 6/2015 | D'Errico | F16K 31/0651 141/311 R |

OTHER PUBLICATIONS

International Search Report of PCT/IB2015/051976 dated Jun. 10, 2015.

* cited by examiner

BISTABLE ELECTRIC VALVE, IN PARTICULAR FOR A SYSTEM FOR RECOVERING PETROL VAPOURS IN A MOTOR VEHICLE

CROSS REFERENCE TO RELATED APPLICATIONS

This application is a National Stage of International Application No. PCT/IB2015/051976 filed Mar. 18, 2015, claiming priority based on Italian Patent Application No. TO2014A000224 filed Mar. 19, 2014, the contents of all of which are incorporated herein by reference in their entirety.

The present invention relates to a bistable electric valve, in particular for a system for recovering petrol vapours in a motor vehicle.

A bistable electric valve for such an application is known for example from the United States patent application US 2004/0040547 A1. The electric valve described in this document comprises a housing body with a first union intended to be connected to the atmosphere and a second union intended to be connected to a container (canister) which collects the petrol vapours from the petrol tank of a motor vehicle. In the housing body there is defined a chamber which communicates with the aforementioned unions and in which there is provided a valve seat with which an obturator for controlling communication between said unions is associated. The obturator is integral with a permanent magnet movable between two pole shoes in the region inside a control solenoid.

Another bistable electric valve, for use in refrigerating circuits, is known from the patent application FR 2,600,150 A1.

A further bistable electric valve is described in the Italian patent IT 1,308,473 B1 in the name of the same Applicant.

An object of the present invention is to provide a bistable electric valve of the improved type, in particular for use in a system for recovering petrol vapours in a motor vehicle.

This object and other objects are achieved according to the invention by means of a bistable electric valve comprising a hollow housing in which there is defined a chamber having first and second openings;

a main obturator made of ferromagnetic material, arranged inside said chamber and displaceable between first and second working positions in which it respectively closes and opens said first opening for enabling and disabling respectively a flow of fluid from the second opening to the first opening; the main obturator having at least one calibrated through-hole for establishing communication between the region upstream and the region downstream of said obturator;

first and second permanent magnets, mounted in said housing in the vicinity of said first and second openings, respectively, and designed to keep the obturator in the first and second working positions, respectively;

an auxiliary obturator mounted movable in the region comprised between the main obturator and said second opening, upstream of the through-hole of the main obturator, between first and second positions in which it closes and opens said through-hole, respectively;

a third permanent magnet, integral with the auxiliary obturator; and a control solenoid arranged around the path of the main obturator and the auxiliary obturator and designed to generate a magnetic flux tending to cause the attraction of the main obturator and the auxiliary obturator towards one or other of said first and second openings;

the arrangement being such that when the solenoid is de-energized the electric valve assumes a first stable condition in which the auxiliary obturator closes the through-hole of the main obturator, and the latter is arranged in said first working position in which it closes said first opening, or a second stable condition in which the main obturator is arranged in the second working condition in which it opens said first opening; and when the solenoid is energized while the electric valve is in the first stable condition, the magnetic flux generated by the solenoid causes the third permanent magnet and the auxiliary obturator to pass into said second condition in which the auxiliary obturator opens the through-hole of the main obturator, and thereafter the main obturator to pass into the aforementioned second position; and when the solenoid is energized while the electric valve is in the second stable condition, the magnetic flux generated by the solenoid causes the main obturator and the auxiliary obturator to return into the respective first positions.

Further characteristic features and advantages of the invention will become clear from the following description provided purely by way of a non-limiting example, with reference to the accompanying drawings in which.

Figure 1:
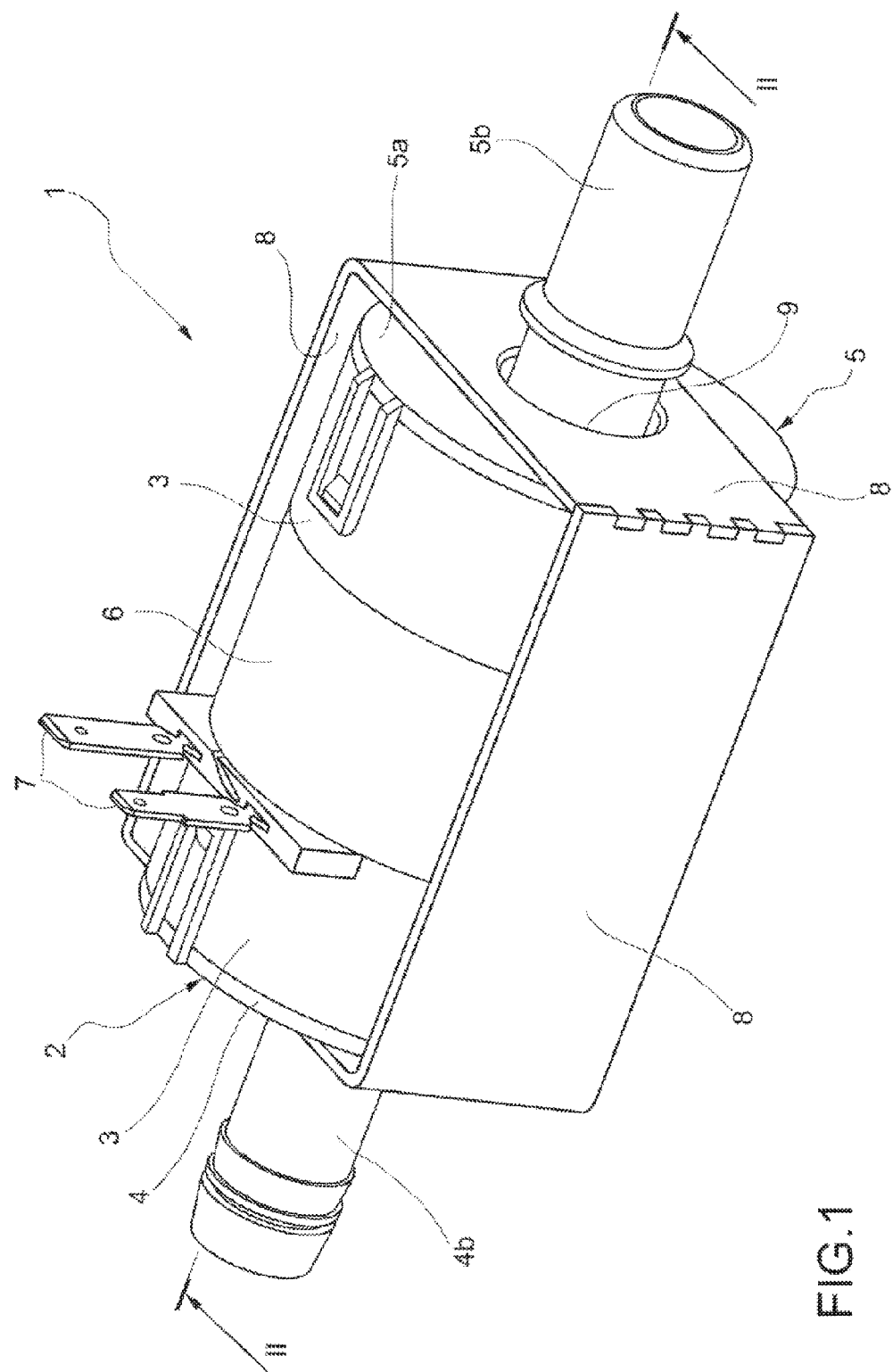
FIG. 1 is a perspective view of a bistable electric valve according to the present invention.

In the drawings 1 denotes overall a bistable electric valve according to the present invention intended in particular for use in a system for recovery of petrol vapours in a motor vehicle.

The electric valve 1 comprises a hollow support housing, denoted overall by 2, comprising an essentially tubular central portion 3 at the ends of which respective terminal portions indicated by 4 and 5 are connected.

The portions 3 to 5 of the support housing 2 may be conveniently made of moulded plastic material, for example a polyamide 6-6.

In the example of embodiment shown the intermediate portion 3 of the support housing 2 has essentially cylindrical opposite terminal parts 3a, 3b which have substantially the same diameter, and an intermediate portion 3c which is also essentially cylindrical and has a smaller diameter.

Figure 2:
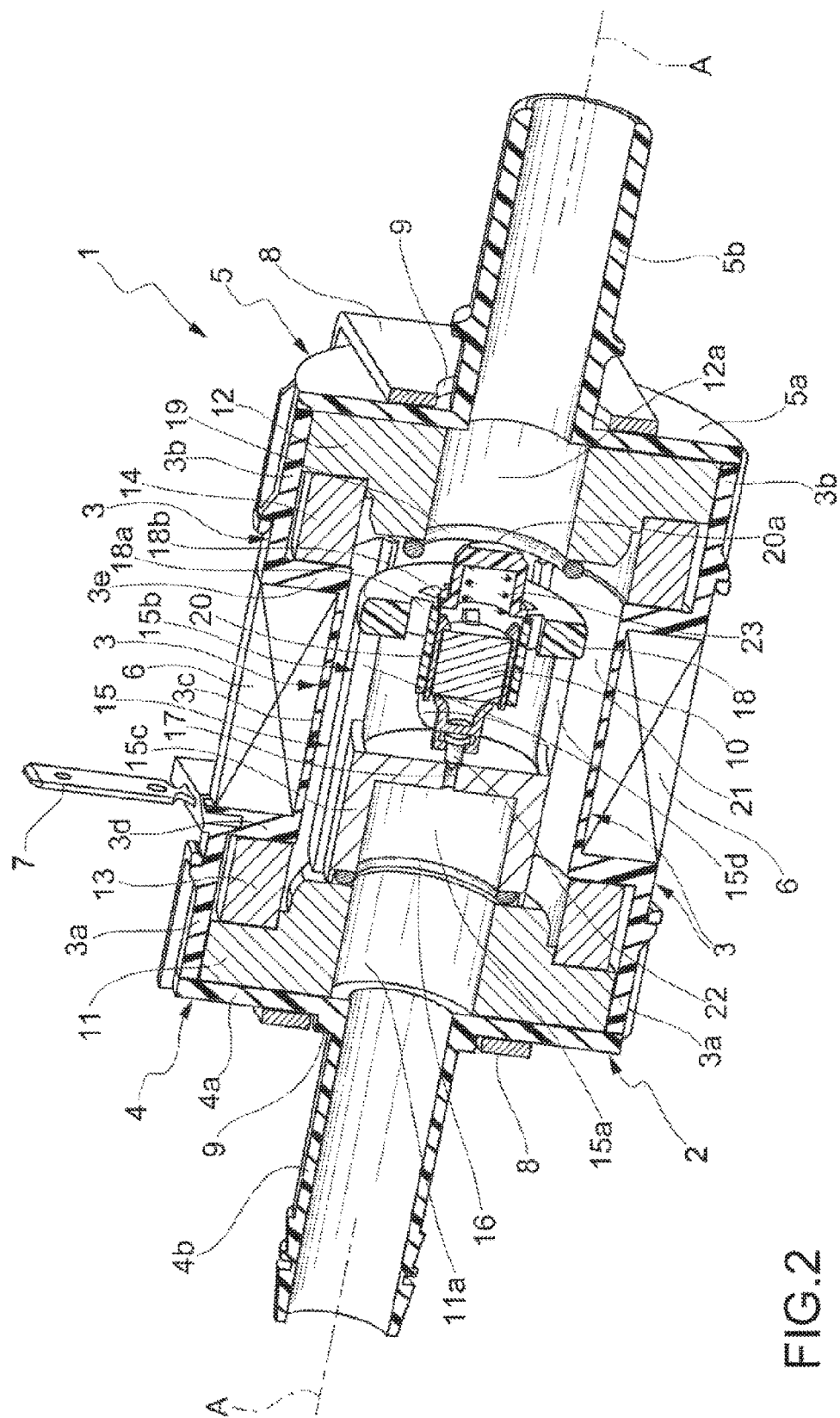
FIG. 2 is an axially cross-sectioned view along the line II-II of FIG. 1.
Figure 3:
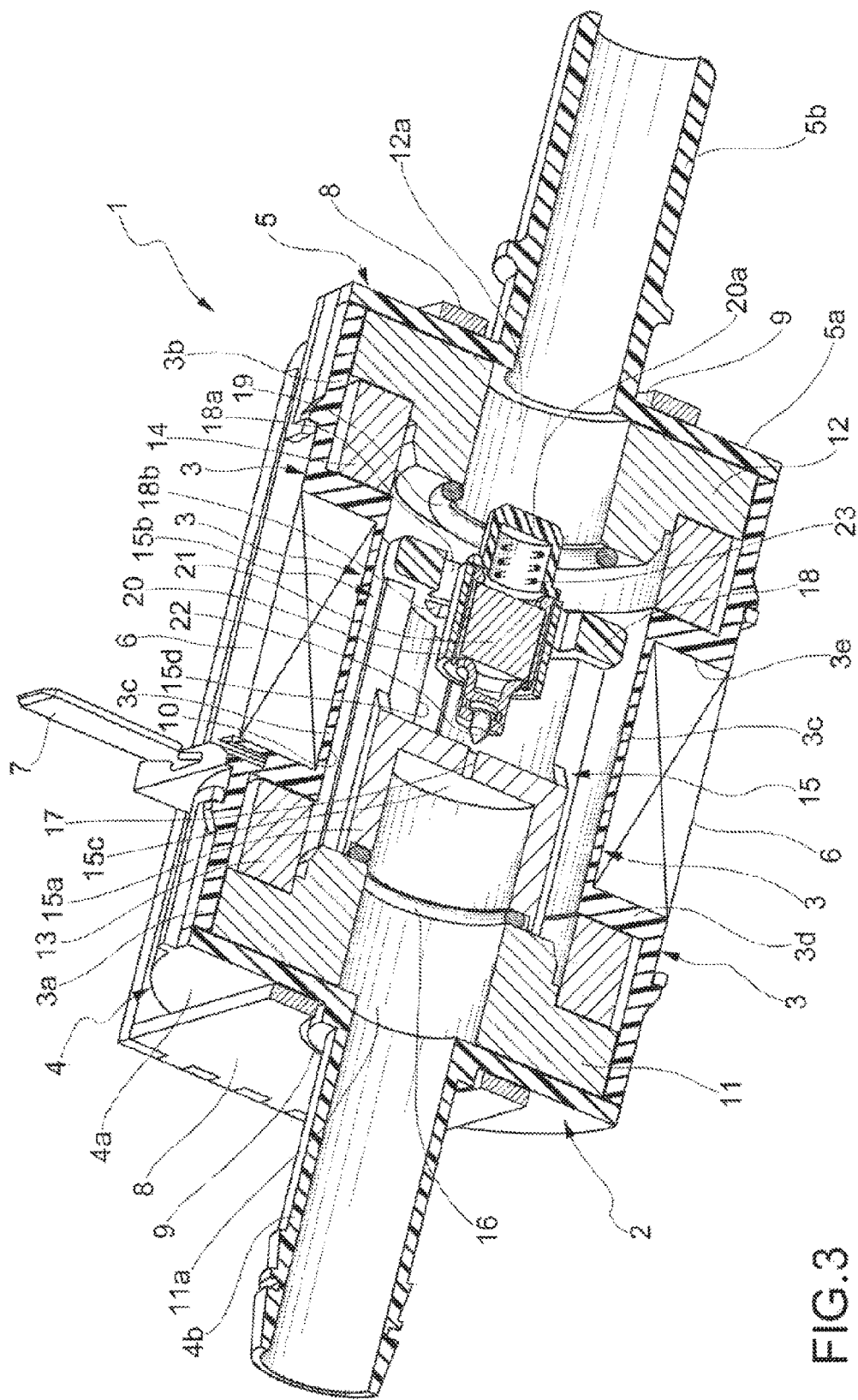
FIG. 3 is a view similar to that shown in FIG. 2 and shows another operative condition of the bistable electric valve.

The end portions 3a and 3b are connected to the intermediate portion 3c by means of two annular walls 3d and 3e integral therewith (see in particular FIGS. 2 and 3).

The terminal portions 4 and 5 of the support housing 2 have respective annular walls 4a and 5a from the central opening of which respective tubular connecting formations 4b and 5b acting as an outlet and an inlet, respectively, extend in opposite directions, said formations being axially aligned with each other along the axis A-A of the electric valve 1.

A control winding or solenoid 6 is housed outside the support housing 2, inside the annular cavity defined between the walls 3c, 3d and 3e and can be connected to a control circuit (not shown) by means of electric terminals 7 connected to its ends.

As can be more clearly seen in FIG. 1, a closed magnetic circuit extends around the support housing 2, said circuit being formed with two laminations 8, for example made of metal, folded in an L-shape and having their respective ends seamed together (see also FIG. 3).

A chamber 10 is defined inside the housing 2 and is able to communicate with the unions 4b and 5b, as will be described more clearly below.

The unions 4a and 5b in the embodiment shown extend through corresponding openings 9 provided in facing sections of the laminations 8 which form the external magnetic circuit (see for example FIGS. 1 and 2).

In FIGS. 2 to 5, 11 and 12 denote two annular pole shoes made of ferromagnetic material, for example steel, having respective central openings 11a and 12a which are aligned with the unions 4b and 5b, respectively, of the support housing 2.

Two annular permanent magnets 13 and 14, for example made of FeSt, coaxial with the longitudinal axis A-A of the electric valve 1, are positioned inside the support housing 2 between the pole shoes 11, 12 and the annular walls 3d, 3e.

The chamber 10 defined inside the support housing 2 contains an axially displaceable main obturator made of ferromagnetic material, for example steel, denoted overall by 15 in FIGS. 2 to 5.

The obturator 15 in the embodiment shown comprises a first axial portion 15a which is essentially cup-shaped, with its inlet opening directed towards the pole shoe 11. The edge of the inlet opening along the portion 15a of the obturator 15 faces a sealing O-ring 16 fixed to the surface of the pole shoe 11 which faces the obturator 15.

The arrangement is such that when the portion 15a of the obturator 15 with its annular edge of the inlet opening presses against the sealing ring 16, the chamber 10 is disconnected from the opening 11a of the pole shoe 11 and the union 4b.

The arrangement is moreover such that, when the obturator 15 is in the working position shown in FIGS. 2 and 3 and its portion 15a presses against the sealing ring 16, it is able to be retained in this position owing to the attraction exerted on it by the permanent magnet 13, via the pole shoe 11.

The portion 15a of the obturator 15 has a transverse end wall 15c inside which a calibrated central through-hole 17 is formed, said hole allowing communication between the upstream and downstream regions of this wall.

The main obturator 15 also has a second portion, indicated by 15b, in FIG. 2 et seq. This portion is also essentially cylindrical tubular and extends on the opposite side to the portion 15a relative to the transverse wall 15c.

A plurality of longitudinal through-slits 15d are formed in the side wall of the portion 15b of the obturator, said through-slits being able to place in communication with each other the radially inner region and the radially outer region of said portion of the obturator 15.

A support ring 18, for example made of moulded plastic, such as a polyamide 6-6, is firmly connected to the annular end edge of the portion 15b of the main obturator 15.

This ring 18 axially faces a sealing O-ring 19 fixed to the pole shoe 12.

Inside the annular member 18 there extends an essentially cup-shaped body 20 arranged so that its inlet opening is directed towards the intermediate transverse wall 15c of the main obturator 15. This body 20 is connected to the support element 18 by means of a plurality of spokes 18a between which a plurality of axial passages 18b are defined.

The ring 18, the body 20 and the spokes 18a may be conveniently formed as one piece.

The passages 18b face the opening 12a of the pole shoe 12.

As will emerge more clearly below, the main obturator 15 is able to assume a second working position, shown in FIG. 4, where the support ring 18, integral therewith, presses against the sealing O-ring 19.

Figure 4:
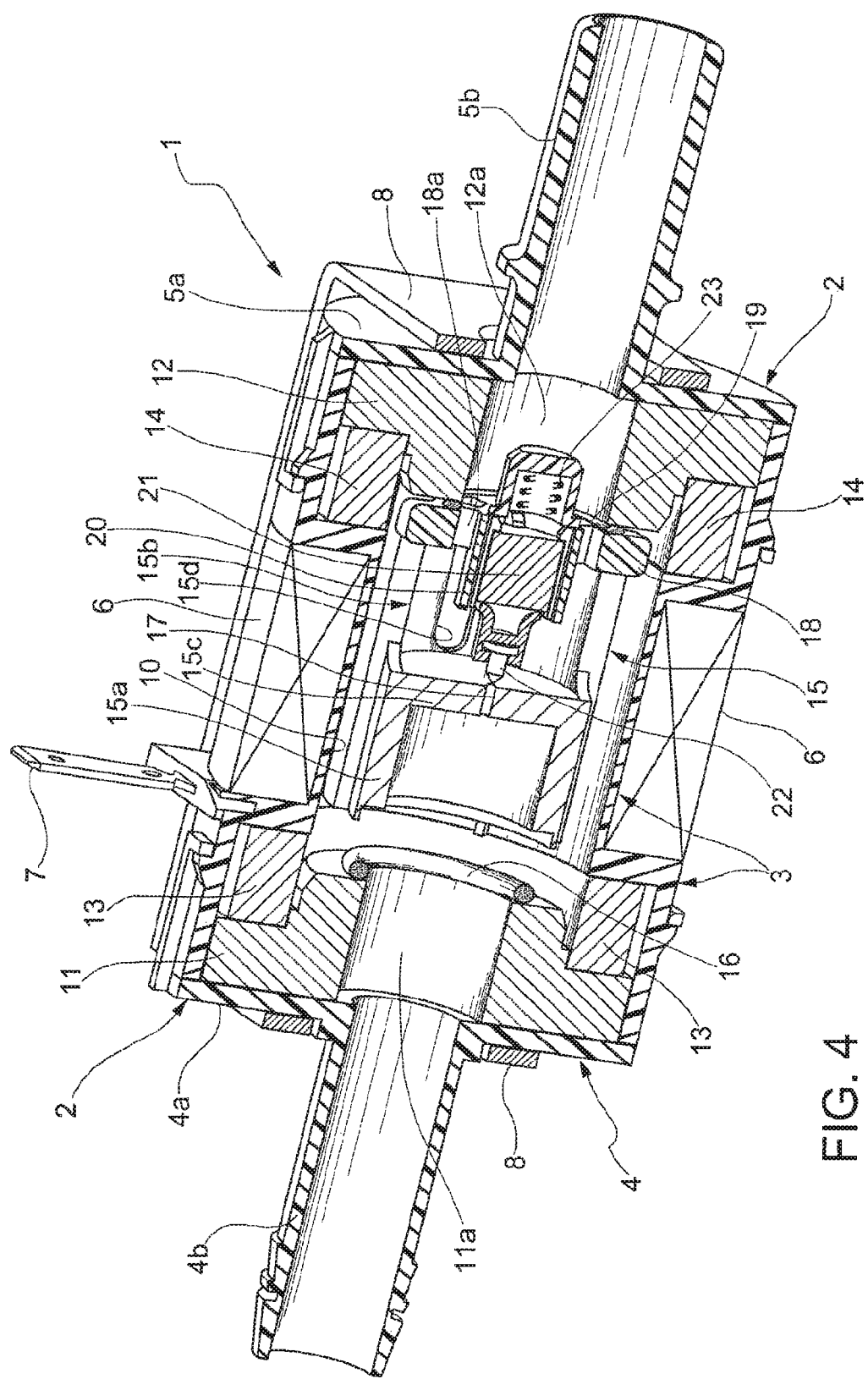
FIG. 4 is similar to the views shown in FIGS. 2 and 3 and shows another operative condition of the bistable electric valve.
Figure 5:
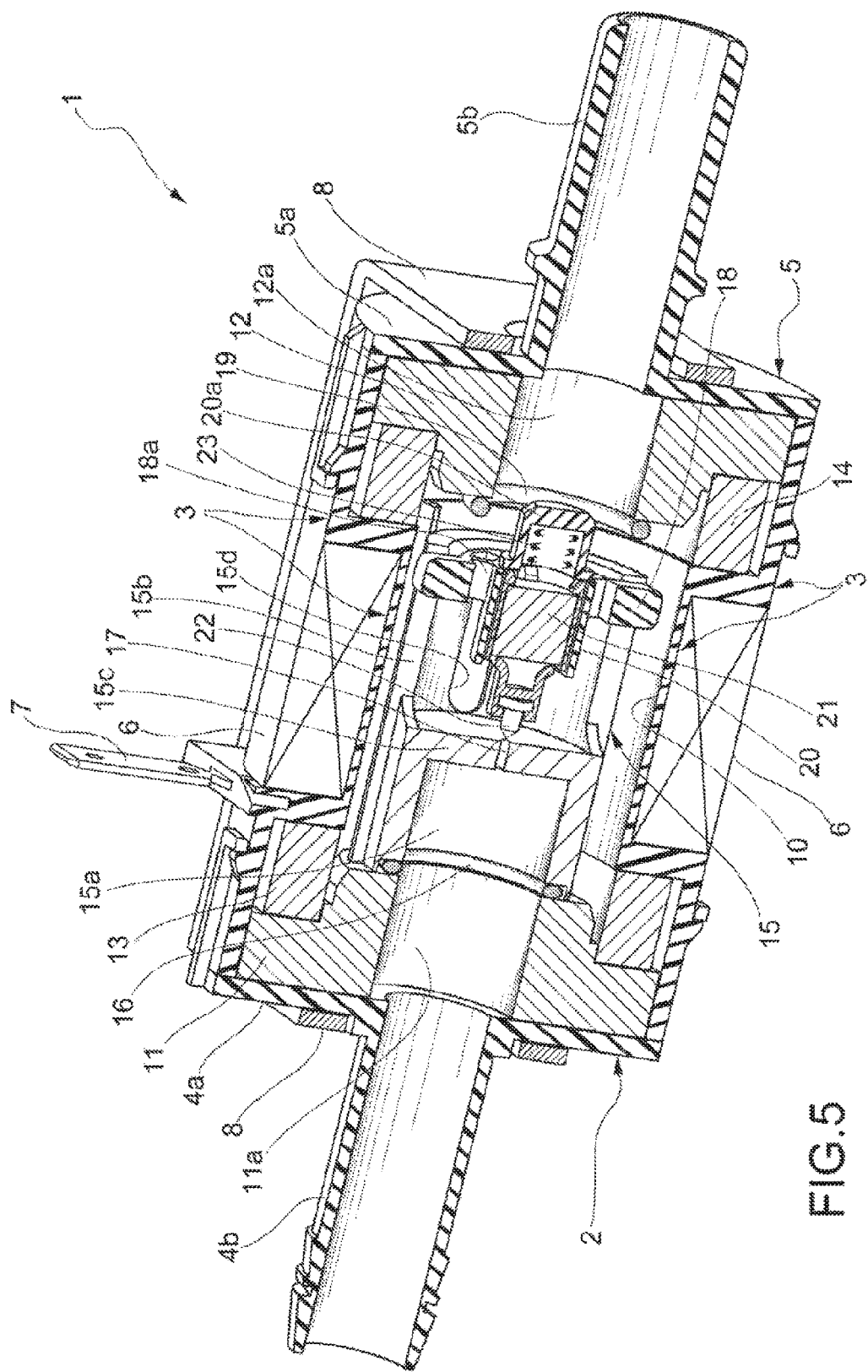
FIG. 5 is a view similar to the preceding view and shows a further operative condition of the bistable electric valve.

In the condition shown in FIG. 4, the chamber 10 moreover communicates with the region inside the union 4b and the opening 11a of the pole shoe 11, since the portion 15a of the obturator 15 is spaced from the sealing O-ring 16. Therefore, in the condition shown in FIG. 4, the electric valve 1 is completely pervious between the unions 4b and 5b.

A permanent magnet 21 is mounted axially displaceable inside the body 20. This permanent magnet, on the side directed towards the intermediate transverse wall 15c of the main obturator 15 has an auxiliary obturator 22 operationally cooperating with the calibrated hole 17 in order to form a so-called pilot valve.

A spring 23 may be arranged between the permanent magnet 21 and the end wall 20a of the body 20, said spring tending to push this permanent magnet and the associated obturator 22 towards the intermediate transverse wall 15c of the obturator 15 and the calibrated through-hole 17 of the latter.

The main obturator 15, as already mentioned above, is able to assume a first and a second stable working position.

In the first position, shown for example in FIGS. 2 and 3, the portion 15a of this obturator 15 presses against the sealing ring 16 and disconnects the chamber 10 and the inner region of the union 5b from the union 4b. The obturator 15a is retained in this position owing to the attraction exerted on it by the permanent magnet 13.

In the second stable working position, shown in FIG. 4, the main obturator 15 enables communication between the chamber 10, the opening 11a and the union 4b, in fact establishing communication between the unions 4b and 5b. The main obturator 15 is able to be kept in the position shown in FIG. 4 by the effect of the attraction exerted on it by the permanent magnet 14.

During use, the inlet union 5b of the electric valve 1 is intended to be connected to a fluid source under a certain pressure, for example a canister containing petrol vapours. This fluid, when the electric valve is closed, fills the chamber 16.

An operating cycle of the aforementioned electric valve 1 will now be described, starting from the operative condition shown in FIG. 2.

In the condition shown in FIG. 2, the solenoid 6 is de-energized and the main obturator 15 is in the first working position described above, namely pressed against the sealing O-ring 16, disconnecting the chamber 10 from the opening 11a and the union 4b.

In this condition the auxiliary obturator closes off the calibrated hole 17 of the intermediate transverse wall 15c of the main obturator 15. The electric valve 1 overall therefore is closed.

If, while the electric valve 1 is in the condition shown in FIG. 2, the control winding or solenoid 6 is energized, by means of a current flow circulating in a first predetermined direction, the magnetic field generated by this winding or solenoid causes firstly a displacement of the permanent magnet 21 and the associated auxiliary obturator 22 away from the intermediate transverse wall 15c of the main obturator 15, as shown in FIG. 3.

A first condition is thus assumed where the chamber 10 is placed in communication with the opening 11a and the union 4b via the small calibrated hole 17.

The pressurized fluid contained in the chamber 10 may therefore gradually spread through the hole 17, beyond the wall 15c of the main obturator. As a result the pressure which this fluid inside the chamber 10 exerts against the main obturator 15 gradually diminishes in the direction of the sealing O-ring 16.

At a certain point, since this pressure is no longer present, the magnetic field produced by the winding or solenoid 6 is stronger than the attraction which the permanent magnet 13 exerts on the main obturator 15, and the latter therefore abandons the first working position and moves towards the second working position shown in FIG. 4.

As a result of this displacement, the chamber 10 is placed in communication with the opening 11a and the union 4b via a very broad section such that the unions 5b and 4b fully communicate. The winding or solenoid 6 may therefore be de-energized, but the main obturator 15 remains in the second working position, shown in FIG. 4, owing to the attraction exerted on it now by the permanent magnet 14.

This condition is again a stable condition in which the electric valve 1 does not use energy since the winding or solenoid 6 is de-energized.

In this condition, owing to the mutual attraction between the magnet 21 and the main obturator 15 as well as the thrust of the spring 23, where present, the auxiliary obturator 22 closes off the calibrated passage 17. This, however, does not prevent full communication between the unions 5b and 4b through the passages 18b defined in the annular support member 18, the eyelets 15d of the main obturator 15 and the opening 11a formed in the pole shoe 11.

When the winding or solenoid 6 is again energized while the solenoid valve 1 is in the stable condition shown in FIG. 4, this time, by means of a current flow circulating in a second direction, opposite to the preceding direction, the magnetic field generated by the solenoid causes both the permanent magnet 21 and the main obturator 15 to pass from the condition shown in FIG. 4 to the condition shown in FIG. 2.

The electric valve 1 is then closed again.

After the winding or solenoid 6 has been de-energized again, the electric valve 1 remains in the stable condition shown in FIG. 2 as a result of the attraction between the permanent magnet 13 and the main obturator 15 and between the latter and the permanent magnet 21.

If, while the electric valve 1 is located in the stable condition shown in FIG. 2, a counter-pressure is formed in the outlet union 4b and in the opening 11a as well as inside the portion 15a of the main obturator 15, this counter-pressure causes the assembly formed by the auxiliary obturator 22 and by the associated permanent magnet 21 to move away from the calibrated hole 17.

This counter-pressure may then be vented inside the chamber 10, through the momentarily open hole 17.

Once the counter-pressure has been released, the obturator 22 and the magnet 21 assume again the condition shown in FIG. 2.

Figure 6:
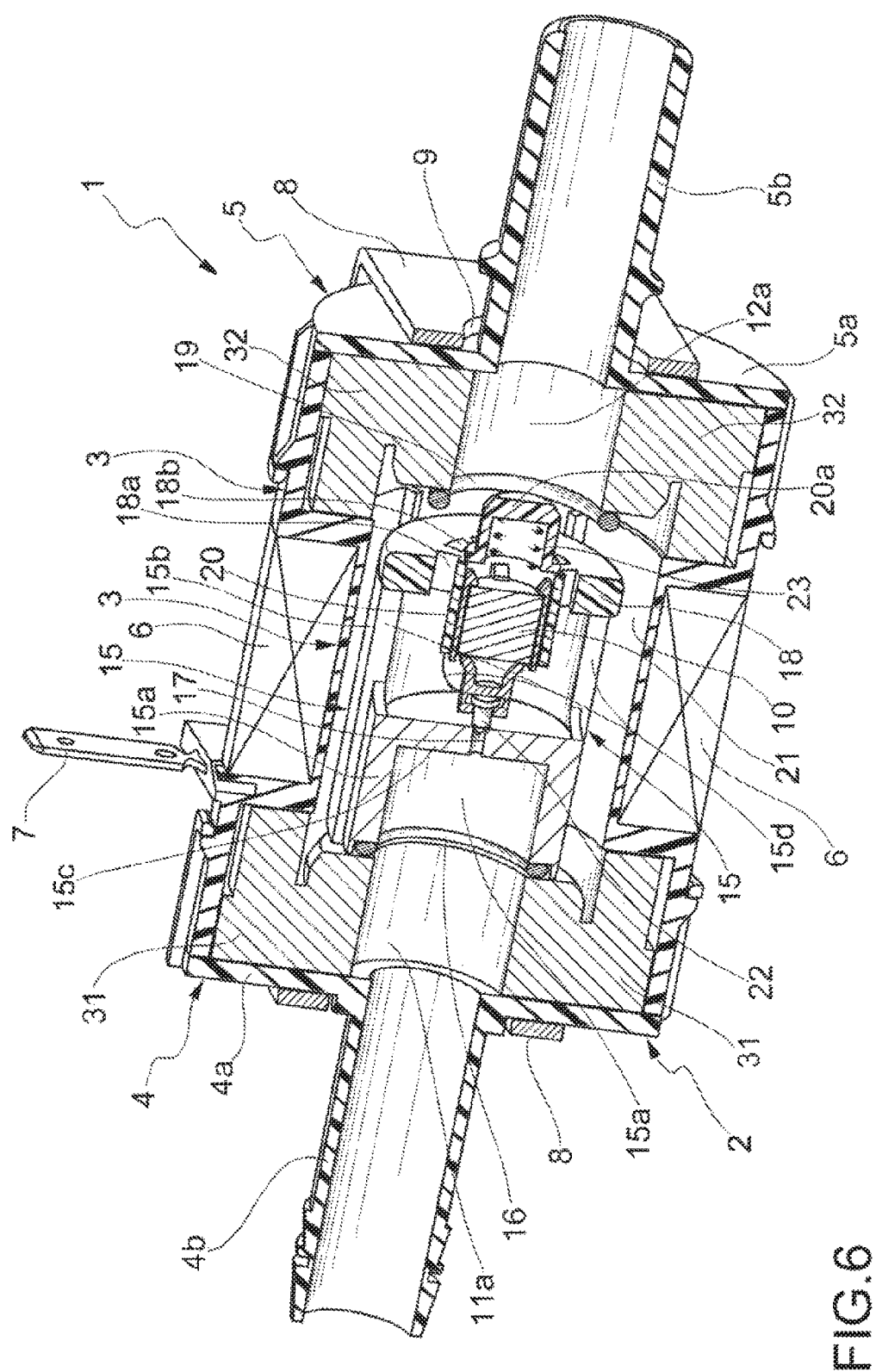
FIG. 6 is similar to FIGS. 2 to 5 and shows a variation of embodiment.

FIG. 6 shows a variation of embodiment.

In this figure parts and elements already described have again been assigned the same reference numbers and letters used previously.

The variant according to FIG. 6 differs from the embodiment described previously essentially because the two groups formed by the pole shoes 11 and 12 and by the associated permanent magnets 13 and 14 are wholly replaced by corresponding annular permanent magnets indicated by 31 and 32 in FIG. 6. These magnets 31 and 32 may be made of plastoferrite or plasto-neodymium.

The operating modes of the variation of embodiment according to FIG. 6 are practically identical to those of the embodiment described and illustrated with reference to the preceding figures and will therefore not be further described.

Obviously, without altering the principle of the invention, the embodiments and the constructional details may be greatly varied with respect to that described and illustrated purely by way of a non-limiting example, without thereby departing from the scope of the invention as defined in the accompanying claims.

The invention claimed is:

1. A bistable electric valve for a system for recovering petrol vapours in a motor vehicle, comprising:
   a hollow housing in which there is defined a chamber having first and second openings;
   a main obturator made of ferromagnetic material, arranged inside said chamber and displaceable between first and second working positions in which it respectively closes and opens said first opening for enabling and disabling respectively a flow of fluid from the second opening to the first opening, the main obturator having at least one calibrated through-hole for establishing communication between a region upstream and a region downstream of said main obturator;
   first and second permanent magnets mounted in said housing in the vicinity of said first and second openings, respectively, and designed to keep the main obturator in the first and second working positions, respectively;
   an auxiliary obturator mounted movable in a region comprised between the main obturator and said second opening, upstream of the at least one calibrated through-hole of the main obturator, between first and second positions in which it closes and opens said at least one calibrated through-hole, respectively;
   a third permanent magnet, integral with the auxiliary obturator; and
   a control solenoid arranged around the path of the main obturator and the auxiliary obturator and configured to generate a magnetic flux tending to cause the attraction of the main obturator and the auxiliary obturator toward one or other of said first and second openings,
   wherein when the control solenoid is de-energized the bistable electric valve assumes a first stable condition, in which the auxiliary obturator closes the at least one calibrated through-hole of the main obturator, and the main obturator is arranged in said first working position in which it closes said first opening, or a second stable condition, in which the main obturator is in the second working condition in which it opens said first opening,
   wherein when the control solenoid is energized while the bistable electric valve is in said first stable condition, the magnetic flux generated by the control solenoid causes the third permanent magnet and the auxiliary obturator to pass into said second position in which the auxiliary obturator opens the at least one calibrated through-hole of the main obturator, and thereafter the main obturator to pass into the second working position and the auxiliary obturator to return into its first position, and wherein when the control solenoid is energized while the bistable electric valve is in the second stable condition, the magnetic flux generated by the control solenoid causes the main obturator and the auxiliary obturator to return into the respective first working and first positions.

2. The bistable electric valve according to claim 1, wherein said housing comprises first and second pole shoes made of ferromagnetic material, in which said first and second openings are provided, said first and second permanent magnets being adjacent to said pole shoes.

3. The bistable electric valve according to claim 1, wherein said first and second openings are provided in said first and second permanent magnets.

4. The bistable electric valve according to claim 1, wherein the third permanent magnet is movable in a body which is integral with the main obturator.

5. The bistable electric valve according to claim 1, wherein said first and second openings, said first, second and third permanent magnets and said main and auxiliary obturators are coaxial with each other.

6. The bistable electric valve according to claim 1, wherein resilient means urge the third permanent magnet towards the calibrated through-hole of the main obturator.

7. A system for recovering petrol vapours in a motor vehicle, comprising the bistable electric valve according to claim 1.

* * * * *